Patent 3,049,477

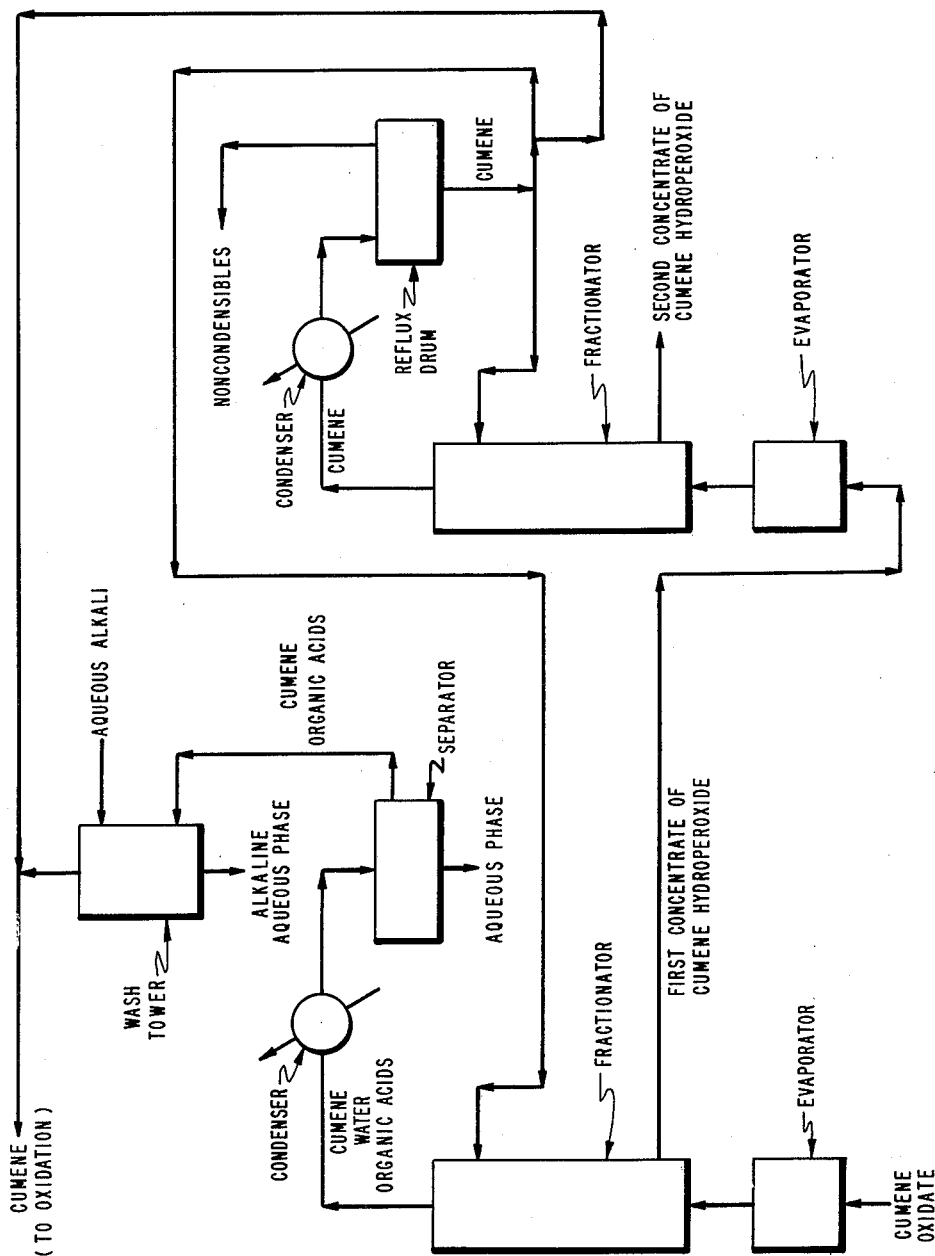

PRODUCTION OF CUMENE HYDROPEROXIDE

Maurice Dudley Cooke, Epsom, England, assignor, by mesne assignments, to Hercules Powder Company, a corporation of Delaware
Filed Jan. 12, 1959, Ser. No. 786,029
Claims priority, application Great Britain Jan. 21, 1958
4 Claims. (Cl. 202—40)

The present invention relates to the production of cumene hydroperoxide, and in particular to the recovery of cumene hydroperoxide in a concentrated form from cumene oxidation products.

The production of cumene hydroperoxide by the liquid phase oxidation of cumene with molecular oxygen is well known. In this process the oxidation reaction is usually carried out to give an oxidation product containing cumene hydroperoxide in admixture with smaller or larger amounts of unreacted cumene. Since the hydroperoxide is normally required in a more concentrated form, for instance where it is to be decomposed to phenol, it is then necessary to separate the hydroperoxide at least partially from the other constituents of the crude oxidation product. This is suitably carried out by a fractional distillation, preferably under reduced pressure in which part of the overhead fraction is condensed and returned to the distillation as liquid reflux; the cumene hydroperoxide, which has a higher boiling point than the cumene and most of the other constituents of the oxidation product, is withdrawn as a liquid fraction. The concentration may be carried out in one or more stages.

It is an object of the present invention to provide an improved method for the recovery of cumene hydroperoxide in a concentrated form from cumene oxidation products.

According to the present invention the process for the concentration of cumene hydroperoxide in cumene oxidation products containing cumene hydroperoxide and unreacted cumene comprises separating by distillation of the oxidation product an overhead fraction containing materials boiling lower than cumene hydroperoxide which is recycled to the oxidation, withdrawing a liquid fraction containing cumene hydroperoxide in a more concentrated form and adding fresh cumene to the still as liquid reflux.

The discovery on which the present invention is based is that the overhead fraction obtained in the fractional distillation of the cumene oxidation product unexpectedly contains varying amounts of acid, in the form of organic acids, such as formic and acetic acids. The process of the invention is particularly adapted to the concentration of cumene oxidation products containing a significant proportion of cumene, so that the overhead fraction obtained in the distillation contains a substantial proportion of cumene which can be recycled to the oxidation stage. By withdrawing the total overhead fraction and not returning any part of this fraction to the still as liquid reflux, but feeding instead fresh cumene to the top of the still, the undesirable build-up of too high concentration of acid in the still is avoided. The overhead fraction is recycled to the oxidation stage, suitably after removal of any easily separable aqueous phase, and, if desired, after an alkali-wash to remove acid.

By the term "fresh cumene" is meant cumene containing substantially no water or acid, for instance having a pH not substantially less than 5. This cumene may be derived from the original source of cumene for the oxidation step. In a preferred embodiment, however, the concentration of the cumene oxidation product is carried out in two stages in series, the overhead distillate from the second stage being returned as liquid reflux to both the first and second stages. This system is particularly applicable to the concentration of a cumene oxidate containing about 20% of cumene hydroperoxide. As an illustration of this preferred embodiment the oxidate may be concentrated in a first stage to about 45 to 65% hydroperoxide concentration, and the base product subsequently concentrated in a second stage to between 75 and 85% of cumene hydroperoxide concentration. The distillate fraction from the first stage containing materials boiling lower than cumene hydroperoxide as well as acids and water is recycled to the oxidation stage, suitably after removal of any separate aqueous phase, and, if desired, after an alkali-wash to remove acid. We have found, unexpectedly, that the distillate fraction from the second stage is substantially dry and contains markedly less acid than the corresponding fraction from the first stage, and part of this is fed as liquid reflux to both concentration stages, the remainder being recycled to the oxidation stage.

The concentration of the cumene hydroperoxide may be carried out in any suitable manner. In a preferred embodiment the concentration is carried out using an evaporator, for instance a climbing or falling film evaporator, combined with a vapour/liquid phase separator, if desired provided with some means of fractionation; the evaporator/separator unit is preferably connected in series with a second similar unit, the concentration being carried out in two stages.

The process of the invention is further illustrated with reference to the accompanying drawing and the following example.

Example

A cumene oxidation product containing 23.4% by weight of cumene hydroperoxide, having a pH of 9.0 was concentrated in two stages, both of which consisted of a climbing film evaporator combined with a fractionator, in which the vapour and liquid phases from the evaporator were separated. The oxidation product was fed continuously to the bottom of the first evaporator, and from the head of this mixed vapour/liquid stream was fed to the first fractionator. From the bottom of the first fractionator a fraction containing 46.5% of cumene hydroperoxide, having a pH of 7.1, was obtained. From the top of this fractionator a 2-phase distillate was obtained, the hydrocarbon phase, having a pH of 3.0 and containing 0.43% of cumene hydroperoxide being recycled, after alkali washing, to the oxidation stage. The aqueous phase, having a pH of 2.5, was rejected. Reflux for this fractionator was obtained by recycling part of the distillate from the second stage fractionator.

The cumene hydroperoxide concentrate from the first stage concentrator was passed directly to the second film evaporator, from which the mixed vapour/liquid stream was fed to the second fractionator. From the bottom of the second fractionator was obtained a cumene hydroperoxide concentrate containing 82.5% by weight of cumene hydroperoxide, having a pH of 6.5. The overhead fraction from the second fractionator was substantially anhydrous, contained 0.25% of cumene hydroperoxide, and had a pH of 5.0. Part of this fraction was returned as reflux to both the first and second stage fractionators, and the remainder was recycled to the oxidation stage.

The pH of the concentrates and of the hydrocarbon phases of the overhead fractions was determined by extracting these non-aqueous samples with an equal quantity of distilled water and measuring the pH of the aqueous extract.

I claim:
1. In the process of producing cumene hydroperoxide by the steps comprising oxidation of cumene in the liquid phase to obtain an oxidation reaction mixture comprising cumene hydroperoxide and unreacted cumene, and fractional distillation of the oxidation reaction mixture in a still to obtain an overhead fraction comprising cumene, water and organic acids and a bottoms product compris- ing cumene hydroperoxide in a concentration higher than it occurred in the oxidation reaction mixture, the improvement which comprises withdrawing from the still the total overhead fraction comprising cumene, water and organic acids, recycling to the oxidation step at least the cumene contained in said total overhead fraction, and adding to the still as liquid reflux a fresh cumene characterized by being substantially dry and having a pH not substantially less than 5.

2. The process of claim 1 wherein the total overhead fraction is permitted to separate into an aqueous phase and a hydrocarbon phase containing cumene, and the hydrocarbon phase then is recycled to the oxidation step.

3. The process of claim 2 wherein the hydrocarbon phase prior to being recycled is washed with alkali to remove the organic acids contained in said hydrocarbon phase.

4. The process of claim 1 wherein the bottoms product from the step of fractional distillation of the oxidation reaction mixture is subjected to further fractional distillation in a second stage still to obtain an overhead fraction comprising cumene and a second bottoms product comprising cumen hydroperoxide in a concentration higher than it occurred in the first stage bottoms product, and wherein at least part of the overhead fraction from the second stage is returned to the stills of both stages as liquid reflux.

References Cited in the file of this patent
UNITED STATES PATENTS

| | | |
|---|---|---|
| 2,706,708 | Frank et al. | Apr. 19, 1955 |
| 2,722,506 | Ellis | Nov. 1, 1955 |
| 2,855,437 | Lyons | Oct. 7, 1958 |
| 2,906,789 | McNaughtan | Sept. 29, 1959 |